United States Patent [19]
Gallagher et al.

[11] Patent Number: 5,652,792
[45] Date of Patent: Jul. 29, 1997

[54] TELEPHONE HANDSET AND CRADLE

[75] Inventors: Pat Gallagher, Seattle, Wash.; Carl Engelbrecht, Los Gatos, Calif.

[73] Assignee: Claircom Communications Group, Inc., Seattle, Wash.

[21] Appl. No.: 482,288

[22] Filed: Jun. 7, 1995

[51] Int. Cl.$^6$ .................................................. H04M 1/00
[52] U.S. Cl. ........................... 379/446; 379/454; 379/455
[58] Field of Search ..................... 379/446, 449, 379/426, 454, 455, 428; 455/89, 90, 128

[56] References Cited

U.S. PATENT DOCUMENTS 5,155,766  10/1992  Skowronski .
5,410,597   4/1995  Kepley, III et al. .

FOREIGN PATENT DOCUMENTS 60-21636  2/1985  Japan .
5-122127  5/1993  Japan ................................. 379/446

Primary Examiner—Jack K. Chiang
Attorney, Agent, or Firm—Knobbe, Martens, Olson & Bear, LLP

[57] ABSTRACT

A cradle having a depression configured to receive a handset. A latching mechanism is mounted on the cradle and includes two detents that are biased toward the depression so that the two detents are positioned within two openings in the handset to retain the handset in a secured position. The latching mechanism is movable to a second position wherein the detents are removed from the openings in the handset and the cradle also includes an ejecting mechanism which urges a first end of the housing out of the depression in the cradle. A deformable catch member is position on a first end of the cradle so as to engage with a lip formed on the first end of the housing to partially retain the handset in the depression in the cradle in a partially ejected position. The deformable catch member is flexibly mounted so that the user can remove the handset from the depression in the cradle by pulling up on the handset to force the lip on the handset past the deformable catch member.

22 Claims, 5 Drawing Sheets

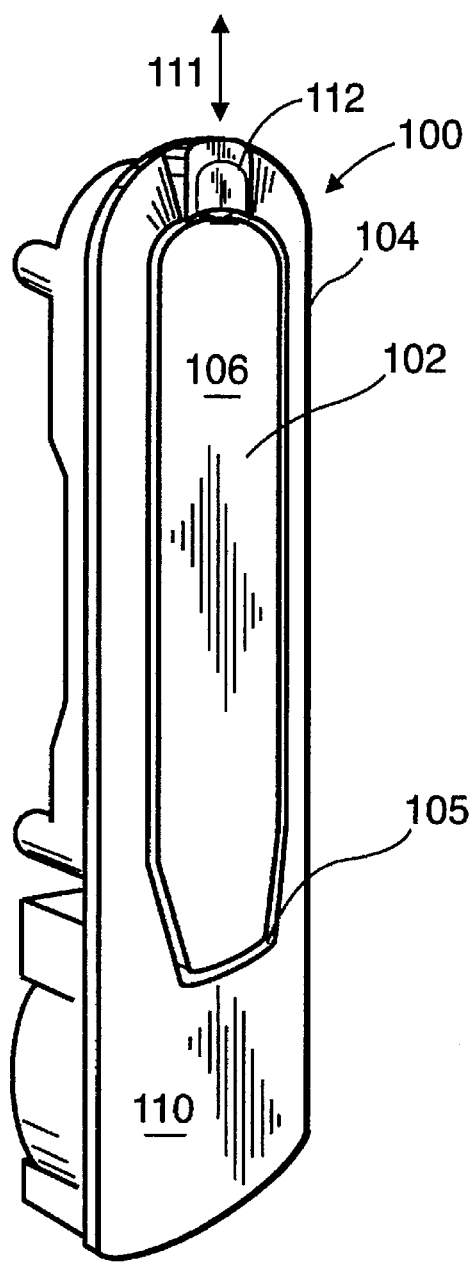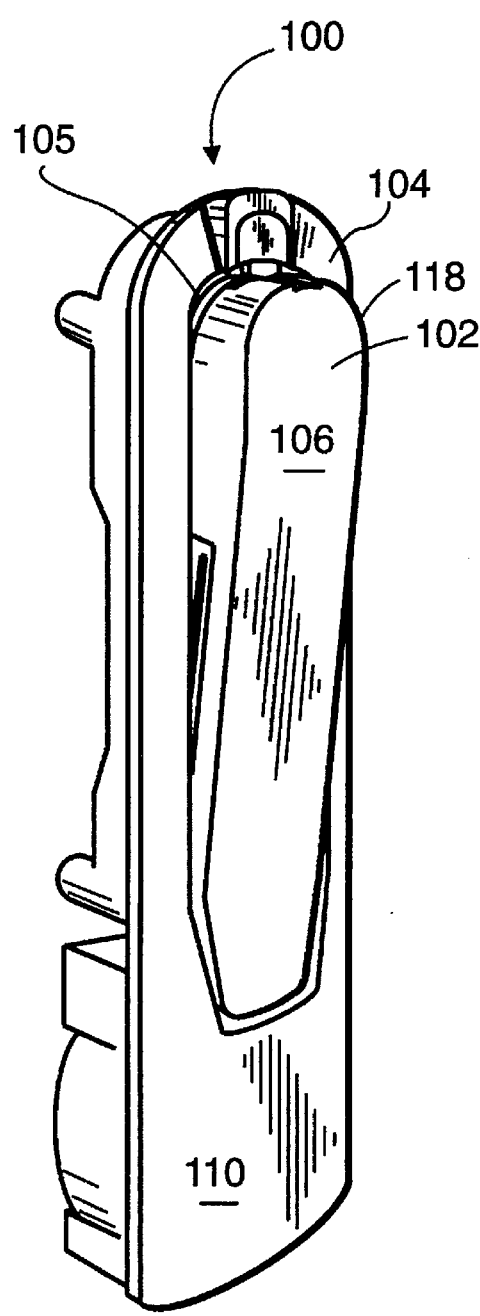
Figure 1
Figure 2

TELEPHONE HANDSET AND CRADLE

BACKGROUND OF THE INVENTION

1. Field of the Invention

The present invention relates to telephone handset and cradle assemblies and, in particular, to telephone handset and cradle assemblies that are configured to be used in moving vehicles such as airplanes.

2. Background of the Invention

Telephones are increasingly being used in vehicles such as automobiles, trains and airplanes. The motion of the vehicle, and in particular vehicles such as airplanes, presents unique difficulties for designers of telephone handsets and cradles. Specifically, the motion of an airplane requires that the handset be securely held inside of its cradle when not in use. However, when the user wishes to make use of the telephone, the user must be able to easily release the handset from the cradle.

One typical approach to this problem is to have the handset secured within the cradle by some sort of latch mechanism. The latch mechanism can be released by the user moving a lever or by the user inserting a credit card into the latch release mechanism. Once the latch mechanism is disabled, the handset portion is then released from the cradle.

A problem that arises with handsets that are fully released when the latch mechanism is disabled is that the handset can fall out of the hands of the user. For example, in an airplane, if the ride is turbulent, or if the user has an extended reach in order to access the telephone, the handset may fall out of the user's hands when released and fall onto the floor, or onto other passengers.

One effort to solve this particular problem is illustrated in U.S. Pat. No. 5,410,597 to Kepley III, et al. In the Kepley patent, the handset is secured in the cradle by a movable tab. Once the movable tab is moved, an ejector apparatus urges the handset into a partially ejected position. The cradle however includes a catch which engages with a detent mounted on the adjacent surface of the handset and which prevents the handset from being completely ejected from the cradle. The user must then pull on the handset so that the detent disengages with the catch on the cradle to completely remove the handset from the cradle.

One problem associated with the handset cradle assembly of the Kepley patent is that the handset is not easily accessible to the user in the partially ejected position. Since the catch on the cradle and the detent on the handset are mounted toward the bottom surface of the cradle and handset respectively, the travel of the handset from the secured position to the partially ejected position is limited. Hence, the handset in the partially ejected position only extends outwardly from the upper surface of the cradle a small amount, which makes the handset hard to grasp.

A further problem associated with the handset cradle assembly of the Kepley patent is that the catch on the cradle is made of a non-deformable plastic and is fixedly mounted in the cradle so as to not have any give. It can be appreciated that repeatedly removing the handset from the cradle, and thereby repeatedly disengaging the detent and the catch, can result in fatigue in the plastic catch, eventually causing the catch to break.

A still further problem associated with the handset cradle assembly of the Kepley patent is that the ejection and catch assembly is complicated. This assembly requires that there be springs and moving parts located in chambers formed in the cradle. It can certainly be appreciated that forming chambers in the cradle and positioning components therein can be costly in terms of manufacturing.

From the foregoing it can be appreciated that there is a need for a handset cradle assembly which is simple in construction, provides easy access to the user and is less prone to breakage due to fatigue.

SUMMARY OF THE INVENTION

The aforementioned needs are satisfied by the handset and cradle assembly of the present invention which is comprised of a cradle having a depression formed therein configured to receive the handset, the cradle also has an ejecting device positioned so as to induce a handset to move out of the cradle, when released. The cradle also has a deformable catch positioned adjacent an outer surface of the handset which engages with a lip formed on the handset to retain the handset in a partially ejected position. The deformable catch is preferably configured so that the user can fully remove the handset from the cradle by simply pulling the handset away from the catch mechanism.

In the preferred embodiment, the cradle is equipped with a spring loaded retaining member that has a pair of teeth which engage with openings on a first end of the handset to retain the handset in a secured position in the cradle. A sliding release member is connected to the spring loaded retaining member so that the user can manipulate the sliding release member to disengage the teeth from the openings in the handset. The ejecting device in the preferred embodiment is comprised of a spring loaded cantilevered member that urges the handset out of the depression in the cradle when the sliding release member has been moved to disengage the teeth from the openings in the handset.

In the preferred embodiment, the deformable catch member is positioned substantially adjacent the outer surface of the opening in the cradle that receives the handset. Further, the deformable catch member is positioned so as to rest inside of a channel formed in the handset. A lip is formed at the inner end of the channel and, when the ejecting device urges the handset out of the cradle, the deformable catch member catches on this lip to retain the handset in the cradle in the partially ejected position. Preferably, the lip is formed toward the inner side of the handset and, since the catch member is positioned substantially adjacent the outer surface of the handset, the end of the handset containing the channel projects outwardly from the face of the cradle a distance that is substantially equivalent to the thickness of the handset. This allows the user to easily grasp the handset and pull it free from the cradle.

In the preferred embodiment, the deformable catch member is comprised of a detent that is biased inwardly from an outer wall of the depression in the cradle toward the channel in the handset. The detent is preferably comprised of a deformable polymeric material. The biasing of the detent is preferably flexible so that, in response to the user grasping the handset and pulling it away from the cradle, the deformable material of the detent and the biasing of the detent give sufficiently to permit the handset to be fully removed from the cradle. It will be appreciated that since the detent is formed of a deformable material that has a memory and the detent is flexibly biased, removal of the handset will not cause stress to be transmitted to the components of the catch mechanism, thereby prolonging the useful life of the cradle and handset assembly.

These and other objects and features of the present invention will become more fully apparent from the follow-

3 ing description and appended claims taken in conjunction with the accompanying drawings.

BRIEF DESCRIPTION OF THE DRAWINGS

FIG. 1 is a perspective view of a preferred embodiment of a handset and cradle assembly of the present invention with the handset in a secured position within the cradle;

FIG. 2 is a perspective view of the handset and cradle assembly of FIG. 1, wherein the handset is in a partially ejected position;

DETAILED DESCRIPTION OF THE PREFERRED EMBODIMENTS

Figure 3:
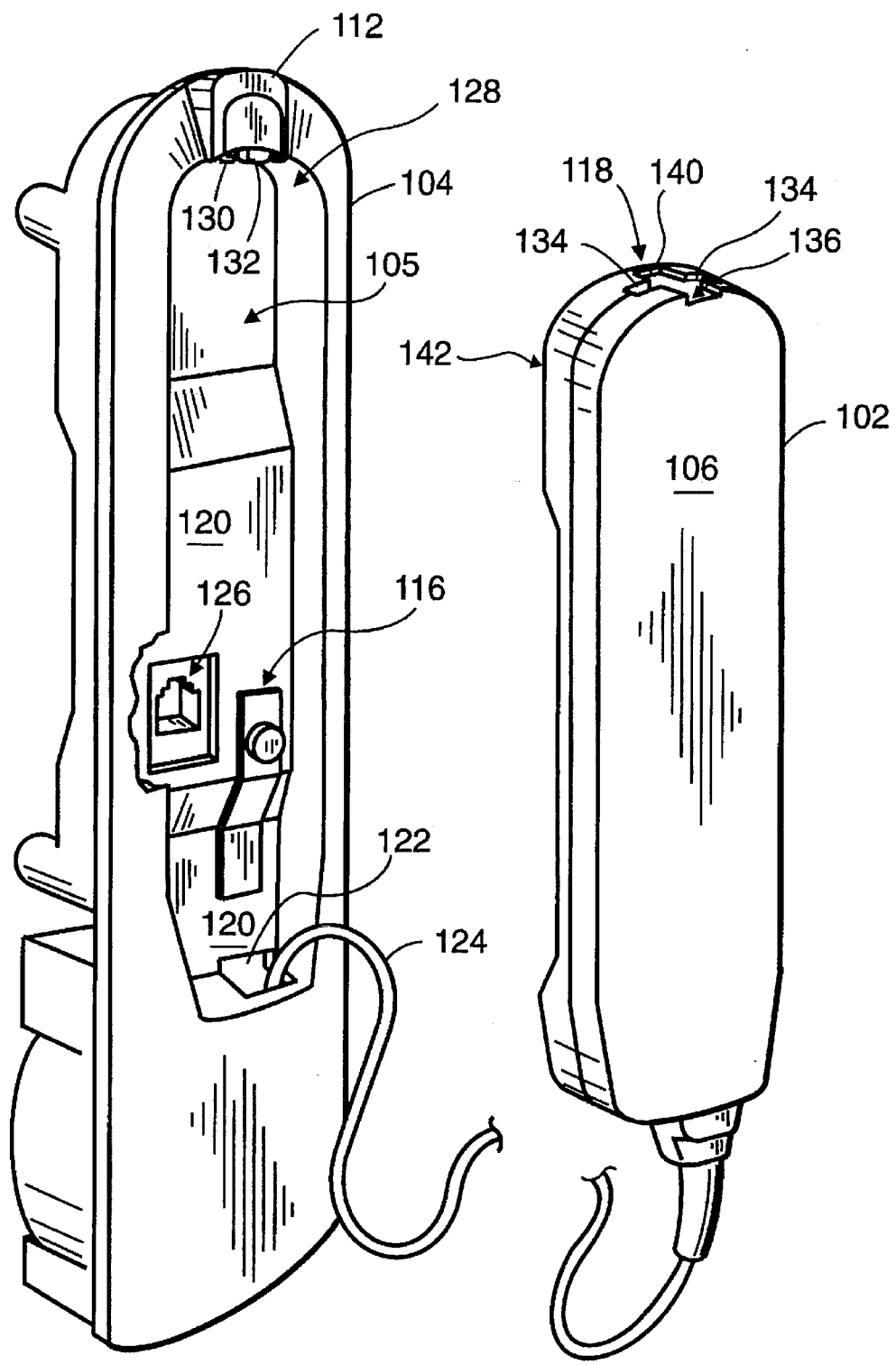
FIG. 3 is a perspective view of the handset and cradle assembly of FIG. 1, wherein the handset has been fully removed from the cradle.

Reference will now be made to the drawings wherein numerals refer to like parts throughout. FIG. 1 illustrates a preferred embodiment of a handset and cradle assembly 100 which is comprised of a handset 102 and a cradle 104.

In FIG. 1, the handset 102 is retained in a depression 105 or an opening in the cradle 104 in a secured position. The depression 105 is preferably configured so that the handset 102 is retained with an outer surface 106 of the handset 102 being substantially flush with an outer surface 110 of the cradle 104. The cradle 104 is configured so that it can be flushly mounted on a surface such as the back of a seat in an airplane. Hence, when the handset 102 is in the secured position shown in FIG. 1, and the cradle 104 is flushly mounted on a surface, the assembly 100 of the preferred embodiment does not take up space which can be a valuable consideration in environments such as airplanes where space for the passengers is at a premium.

Generally, the handset 102 is in the fully secured position shown in FIG. 1 until the user decides to use the telephone. The cradle 104 is equipped with a sliding release member 112 which engages with the handset 102, in the manner that will be described in greater detail in reference to FIG. 4, hereinbelow, to securely retain the handset 102 in the fully secured position within the cradle 104. The sliding release member 112 is movable by the user towards and away from the depression 105, in the direction indicated by the arrow 114. This slidable movement allows the user to disengage the sliding release member 112 to thereby allow the handset 102 to be removed from the opening 105 in the cradle 104.

Basically, when the user moves the sliding release member 112 in a first direction away from the depression 105 and the handset 102, an ejecting mechanism 116 (FIG. 3), that will be described in greater detail hereinbelow in reference to FIGS. 5 and 6, induces the handset 102 to move into a partially ejected position shown in FIG. 2. In the partially ejected position, a first end 118 of the handset 102 is substantially ejected from the depression 105 in the handset

4

104, i.e., the first end 118 of the handset 102 is positioned substantially beyond the plane formed by the first surface 110 of the cradle 104. In the partially ejected position, the handset 102 is still partially retained within the cradle 104 in a manner that will be described in greater detail in reference to FIGS. 4–7 hereinbelow.

While the handset 102 is in the partially ejected position the user can fully remove the handset 102 from the cradle 104 by simply grasping the first end 118 of the handset 102 and pulling the handset 102 fully free of the cradle 104. FIG. 3 illustrates the handset 102 in the fully removed position from the cradle 104.

FIG. 3 also illustrates the construction of the handset 102 and the cradle 104 in greater detail. Specifically, the depression 105 in the cradle 104 is configured to have the same general size and shape of the handset 102 so that the handset 102 fits flushly inside of the opening 105. Further, an inner surface 120 of the depression 105 includes an opening 122 through which extends a cord 124 that electrically connects the handset 102 to a telephone system (not shown). In the preferred embodiment, the cord 124 is positioned on a reel assembly 125 (FIGS. 6 and 7) which allows the user to pull the handset 102 away from the cradle 104. The reel assembly 125 is preferably configured to retract the cord 124 in a well known manner so that the cord 124 is securely stored on the reel assembly 125 when the handset 102 is positioned adjacent the cradle 104.

Further, a separate phone jack receptacle 126 is also positioned on the inner surface 120 of the opening 105. It can be appreciated that in some environments, most notably airplanes, users would like to have access for a computer modem. The cradle and handset assembly 100 of the preferred embodiment includes the phone jack receptacle 126 which can be used to plug in a computer modem so that the telephone system can be used to connect a portable computer to a computer network.

FIG. 3 further illustrates that a first end 128 of the cradle 104, wherein the sliding release member 112 is positioned, includes two retaining detents 130 and a deformable catch member 132 positioned on a sidewall 131 of the opening 105. Further, the first end 118 of the handset 102 includes two openings 134, which are configured to receive the two retaining detents 130, and a channel 136 extending from the outer surface 106 of the handset 102 to a lip 140 which is positioned substantially adjacent an inner surface 142 of the handset 102.

The two retaining detents 130 are configured to fit in the two openings 134 to retain the handset 102 in the fully secured position in the cradle 104, as shown in FIG. 1. The deformable catch member 132 is configured to slide in the channel 136 when the sliding release member 112 is moved away from the handset 102, to thereby disengage the detents 130 from the openings 134 and to allow the ejecting mechanism 116 to partially eject the handset 102. However, upon reaching a selected partial ejection position, the deformable catch member 132 catches on the lip 140 preventing further ejecting of the handset 102 so that the handset 102 is retained in the partially ejected position shown in FIG. 2.

Figure 4:
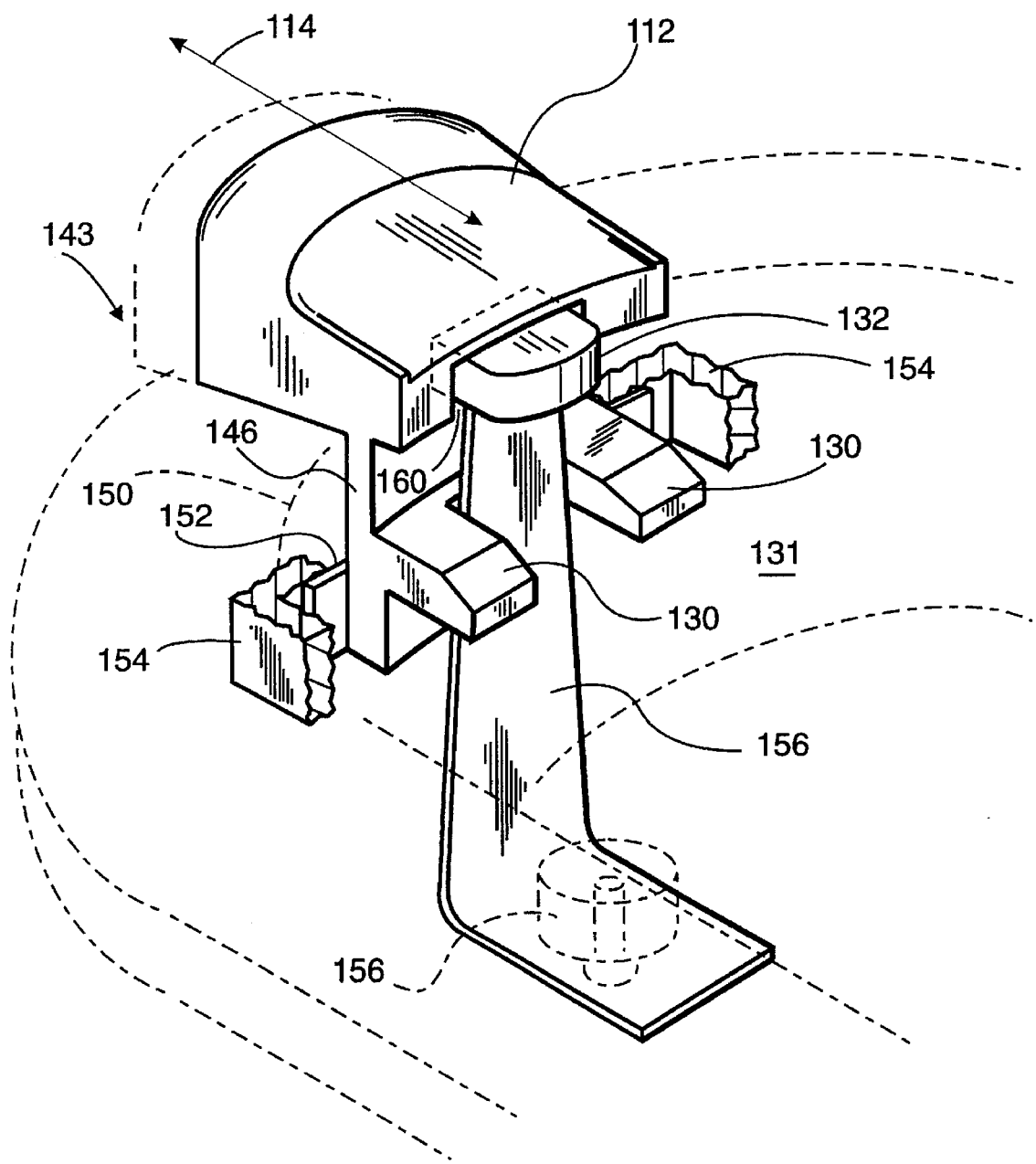
FIG. 4 is a detailed perspective view of a catch assembly positioned within the cradle of FIG. 1 which is used to retain the handset in the cradle in the secured and partially ejected positions.
Figure 5:
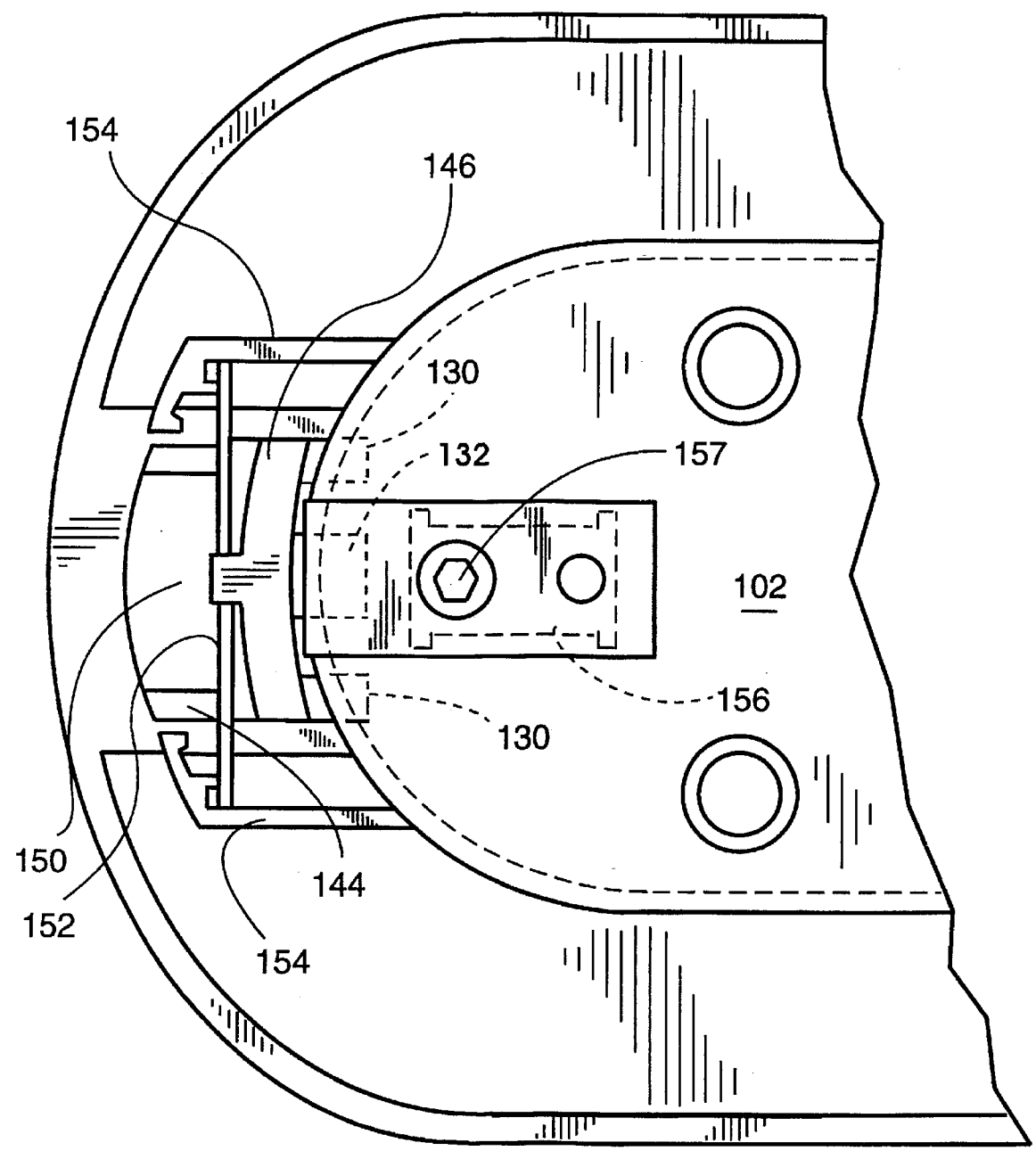
FIG. 5 is a top cut-a-way view of the handset and cradle assembly of FIG. 1.

FIGS. 4 and 5 illustrate a catch mechanism 143, which includes the sliding release member 112, the retaining detents 130 and the deformable catch member 132. The sliding release member 112 is captured within a groove 144 (FIG. 5) formed in the upper surface 110 of the cradle 104. The two retaining detents 130 are mounted on a mounting member 146 (FIG. 4) which is connected to, and extends perpendicularly downward from, the underside of the sliding release member 112. Hence, sliding movement of the sliding release member 112 directed away from the opening 105 results in the retaining detents 130 moving away from and disengaging with the openings 134 in the handset 102 as the retaining detents 130 are connected to the sliding release member 112 via the mounting member 146.

The first end 128 of the cradle 104 also includes a spring mechanism 150 which biases the sliding release member 112, the mounting member 146 and the retaining detents 130 into a first position wherein the retaining detents 130 engage with the openings 134 in the handset 102 to retain the handset 102 in the secured position in the cradle 104. As is most clearly illustrated in FIG. 5, in the preferred embodiment, the spring mechanism 150 is comprised of a flexible piece of metal 152 wherein either end of the piece of metal 152 is captured in a mounting slot 154 formed in the cradle 104. The middle portion of the flexible piece of metal 152 then engages with the side of the mounting member 146 opposite the side on which the retaining detents 130 are mounted. The flexible piece of metal 152 urges the mounting member 146 toward the handset 102 requiring that the user slide the sliding release member 112 away from the handset 102 against the force of the flexible piece of metal 152 to disengage the retaining detents 130 from the openings 134 in the handset 102. Hence, the flexible piece of metal 152 biases the sliding release member 112 and the retaining detents 130 into a first position where they engage with the handset 102 but is movable by the user to a second position wherein the detents 130 do not engage with the openings 134 in the handset 102.

As is also shown in FIG. 4, the deformable catch member 132 is preferably mounted on an L-shaped member 156. The L-shaped member 156 is preferably made of metal and is fixedly mounted to a mounting post 157 formed on the surface of the cradle 104 which is underneath the opening 105. The L-shaped piece of metal 156 is configured so that the deformable catch member 132 is mounted on the top to extend through a hole 160 in the sidewall of the first end 128 of the opening 105 in the cradle 104 to engage with the channel 136 on the handset 102 (FIG. 3). It will be understood that the L-shaped member 156 is preferably positioned so that the L-shaped member 156 biases the deformable catch member 132 inwardly toward the handset 102.

The operation of the catch mechanism 142 will now be described by reference to FIGS. 6 and 7. FIG. 6 is a cross-sectional view of the handset and cradle assembly 100 with the handset 102 positioned within the cradle 104 in the fully secured position. In this position, the handset 102 exerts a force on an ejecting button 162 urging the ejecting button downward into the bottom surface 120 of the depression 105. The ejecting button 162 is preferably mounted on a cantilevered member 163 that is pivotally attached to the cradle 104 so that the button 162 extends into the depression 105. This causes the ejecting button 162 to compress an ejecting spring 164 that is captured within a spring enclosure 165 formed on the surface of the cradle 104 opposite the depression 105. The ejecting button 162 and the ejecting spring 164 comprise the ejecting mechanism 116 of the preferred embodiment.

Figure 6:
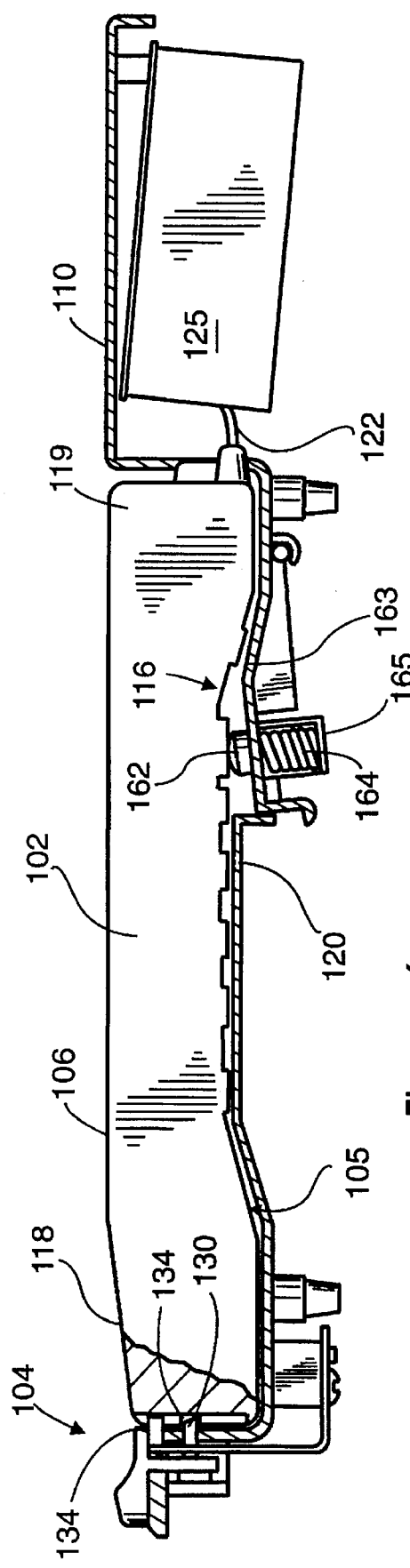
FIG. 6 is a side cut-a-way view of the handset and cradle assembly of FIG. 1 showing the handset in the fully secured position.

As is also shown in FIG. 6, in the fully secured position, the retaining detents 130 are engaged with the openings 134 in the handset 102 to securely retain the handset 102 in the fully secured position wherein the outer surface 106 of the first end 118 of the handset 102 is flush with the outer surface 110 of the cradle 104. Further, as discussed above, the reel assembly 125 is preferably spring loaded to wind up the cord 122 when the handset 102 is not in use. The reel assembly 125 of the preferred embodiment is preferably configured so that the reel assembly 125 prevents the cord 122 from being pulled out from the reel unless it is pulled out by the user after the handset 102 has been removed from the cradle 104. Hence, a second end 119 of the handset 102, opposite the first end 118, is securely retained in the opening 105 as a result of the force exerted by the reel assembly 125 on the cord 124 attached to the second end of the handset 102.

However, once the user moves the sliding release member 112 away from the handset 102, the retaining detents 130 are removed from the openings 134 in the first end 118 of the handset 102. The ejecting mechanism 116 then urges the first end 118 of the handset 102 out of the opening 105 of the cradle 104 until the first end 118 is in the partially ejected position shown in FIG. 6. Specifically, in the preferred embodiment, the ejecting spring 164 urges the ejecting member 163 and ejecting button 162 outward which causes the unsecured first end 118 of the handset 102 to move out of the depression 105.

Figure 7:
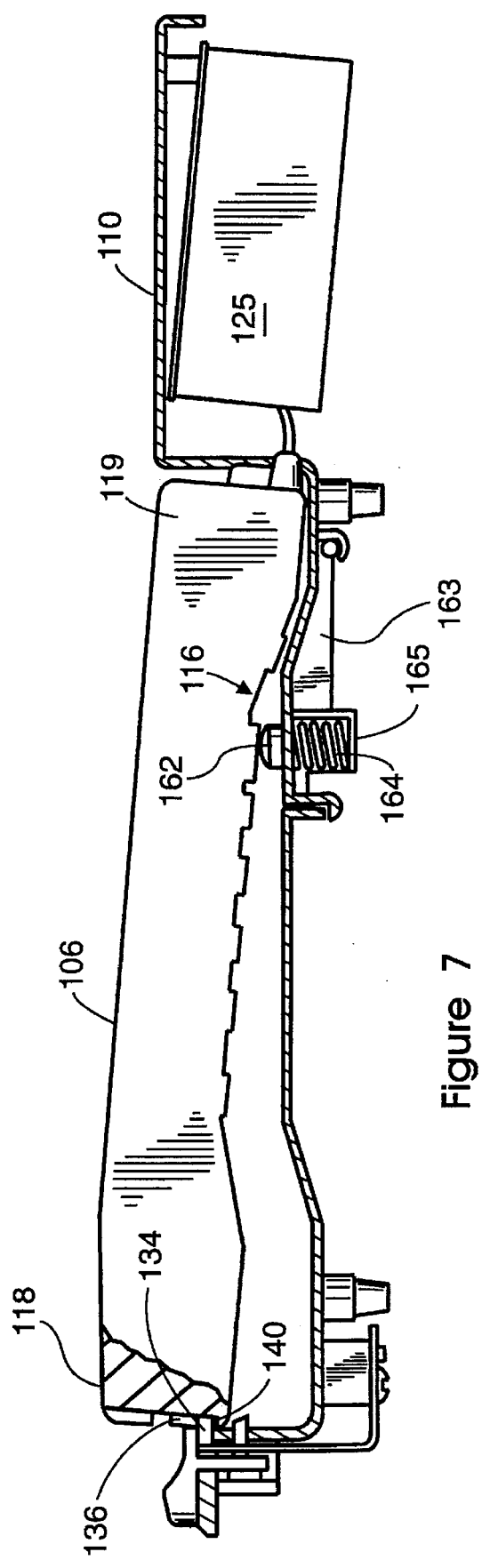
FIG. 7 is a side cut-a-way view of the handset and cradle assembly of FIG. 1 showing the handset in the partially ejected position.

However, as shown in FIG. 7, the deformable catch member 134 catches on the lip 140 formed in the channel 136 retaining the handset 102 partially inside the opening 105 of the cradle 104. Preferably, the ejecting mechanism 116 is configured so that the ejecting button 162 retains the handset 102 in the partially ejected position until the user either completely removes the handset 102 from the cradle 104 or presses the first end 118 of the cradle into the cradle 104 until the spring biased retaining detents 130 re-engage with the openings 134 on the handset 102 to re-secure the handset 102 in the fully secured position.

Once the handset 102 is in the partially ejected position shown in FIG. 6, the user can grasp the handset 102 and pull the first end 118 of the handset 102 free of the cradle 104 by exerting sufficient force to force the lip 140 lying in the channel 136 of the handset 102 past the deformable catch member 132. Further, the user can also exert sufficient force to pull the second end 119 free from the cradle 104 by overcoming the tension on the cord 122 exerted by the reel assembly 125.

Since the catch member 132 is deformable, e.g., in the preferred embodiment is made out of a flexible, somewhat rubbery material, such as an elastomeric material, and since the catch member 132 is mounted on a movable L-shaped member 156, the user, by pulling up on the handset 102, simply compresses the catch member 132 and/or pushes the catch member 132 outwardly away from lip 140 on the handset 102. Once the handset 102 has been removed, the elastomeric material on the catch member 132 returns to its original configuration and the L-shaped member 156 again urges the catch member 132 inwardly.

It will be appreciated that the catch mechanism 150 described hereinabove will minimize the risk of the components of the catch mechanism 143 breaking as a result of repeated use as it will give in response to the user pulling the first end 118 of the handset 102 free of the cradle 104. Further, the catch mechanism 143 of the preferred embodiment is simple to install in the cradle 104 since it is simply comprised of the sliding release member with the attached retaining detents, a spring to bias the sliding release member, the deformable catch member and the L-shaped member on which the deformable catch member is mounted.

It will also be appreciated that the handset and cradle assembly of the present invention facilitates use of the handset by users in vehicle environments such as airplanes, since the handset is securely retained inside the cradle when not in use and can be partially ejected therefrom by simply moving a sliding member. Further, in the partially ejected position, one end of the handset projects outwardly from the surface of the cradle a considerable degree, such that almost the entire thickness of the handset is available to be grasped by the user. This results from positioning the deformable catch member 132 substantially adjacent the upper surface of the handset 102 when the handset 102 is secured in the cradle 104, and from positioning the lip 140 in the channel 136 substantially adjacent the surface of the handset 102 opposite the upper surface 106.

Although the foregoing description of the preferred embodiment of the present invention has shown, described and pointed out the fundamental novel features of the invention, it will be understood that various omissions, substitutions, and changes in the form of the detail of the apparatus as illustrated, as well as the uses thereof, may be made by those skilled in the art, without departing form the spirit of the present invention. Consequently, the scope of the invention should not be limited to the foregoing discussion, but should be defined by the appended claims.

What is claimed is:

1. A handset and cradle assembly comprising:

a handset having an inner and an outer side and a first and a second end wherein said handset has at least one opening formed in said first end, and a lip formed in said at least one opening in said first end substantially adjacent said inner side;

a cradle having an outer surface and also having a depression formed in the outer surface, said depression configured to receive said handset;

a movable catch mechanism positioned adjacent said handset which, in a first position, secures said handset in a secured position in said depression of said cradle by positioning at least one retaining detent in said at least one opening in said handset and wherein said movable catch mechanism, in a second position, removes said retaining detent from said opening in said handset;

an ejecting mechanism configured to urge said handset from said secured position to a partially ejected position when said catch mechanism is dis-engaged from said opening in said handset, wherein said ejecting mechanism is also configured to exert a force against said inner side of said handset; and a catch member positioned adjacent said first end of said handset and substantially adjacent said outer surface of said cradle such that, in the partially ejected position, said catch member engages with said lip on said handset to retain said handset in said partially ejected position in said cradle while said ejecting mechanism urges said handset outward so as to maintain said handset in said partially ejected position and such that a user can remove said handset from said cradle by pulling on said handset to disengage said catch member from said lip.

2. The assembly of claim 1, wherein said handset at said first end has a pre-selected thickness, measured between said inner and said outer side.

3. The assembly of claim 2, wherein said outer side of said handset is substantially flush with said outer surface of said cradle when said handset is in said secured position.

4. The assembly of claim 3, wherein said first end of said handset projects outwardly from said outer surface of said cradle a distance substantially equal to said pre-selected thickness of said handset.

5. The assembly of claim 1, wherein said movable catch mechanism comprises:

a slidable release member that is positioned on said outer surface of said cradle and wherein said slidable release member is movable between a first position and a second position and is spring biased into said first position;

a mounting member which is attached to said slidable release member wherein said at least one retaining detent is positioned on said mounting member so as to project into said depression when said slidable release member is in said first position.

6. The assembly of claim 5, wherein a channel is formed on the first end of said handset, substantially extending between said inner and said outer sides, and wherein said lip is formed in said channel substantially adjacent said inner surface.

7. The assembly of claim 6, wherein said catch member is flexibly mounted on said cradle so that said catch member is spring biased so as to extend into said channel when said handset is in said secured position and so that said catch member disengages with said lip when said user removes said handset from said cradle.

8. The assembly of claim 7, wherein a portion of said catch member which engages with said lip to retain said handset in said partially secured position is formed of a flexible elastomeric material that deforms to allow said lip to disengage from said catch member when said user removes said handset from said cradle.

9. The assembly of claim 1, wherein said ejecting mechanism is comprised of a cantilevered member that is spring biased so as to urge said first end of said handset outward.

10. A handset and cradle assembly comprising:

a handset having an inner and an outer side and a first and a second end wherein said handset has a lip formed on a first end of said handset so that said lip extends substantially perpendicularly from a plane defined by the first end of said handset;

a cradle having an outer surface and a depression that is configured to receive said handset in said depression when said handset is in a secured position;

an ejecting mechanism that engages with said handset to induce said handset to move from said secured position to a partially secured position, wherein at least a portion of said handset extends beyond a plane defined by said outer surface of said cradle; and a deformable catch member that is flexibly mounted to said cradle so as to be movable in a direction substantially perpendicular to the plane of said first end of said handset in response to a user pulling said handset from said cradle, said deformable catch member engaging said handset when said handset is in said partially secured position wherein said deformable catch member is sufficiently flexible so that said catch member engages with said lip to retain said handset in said partially secured position and also disengages from said lip in response to said user pulling said handset free of said cradle.

11. The assembly of claim 10, further comprising a securing mechanism which securely retains said handset in said cradle in said secured position.

12. The assembly of claim 11, wherein said securing mechanism comprises:

a slidable release member that is positioned on said outer surface of said cradle and wherein said slidable release member is movable between a first position and a second position and is spring biased into said first position;

a mounting member which is attached to said slidable release member; and at least one retaining detent which is positioned on said mounting member so as to project into said depression when said slidable release member is in said first position.

13. The assembly of claim 12, wherein at least one opening is formed in said first end of said handset that receives said at least one detent to securely retain said handset in said secured position.

14. The assembly of claim 13, wherein a channel is formed on the first end of said handset, substantially extending between said inner and said outer sides, and wherein said lip is formed in said channel substantially adjacent said inner surface.

15. The assembly of claim 14, wherein said catch member is flexibly mounted on said cradle so that said catch member is spring biased so as to extend into said channel when said handset is in said secured position and so that said catch member disengages with said lip when said user removes said handset from said cradle.

16. A handset and cradle assembly comprising:

a handset having an inner and an outer side and a first and a second end wherein said handset has a pre-selected thickness at said first end and at least one opening formed in said first end, and a lip formed in said at least one opening in said first end substantially adjacent said inner side;

a cradle having an outer surface defining a plane and also having a depression configured to receive said handset formed in said outer surface;

a movable catch mechanism positioned adjacent said handset which, in a first position, secures said handset in a secured position in said depression of said cradle by positioning at least one retaining detent in said at least one opening in said handset and wherein said movable catch mechanism, in a second position, removes said retaining detent from said opening in said handset;

an ejecting mechanism configured to urge said handset from said secured position to a partially ejected position when said catch mechanism is dis-engaged from said opening in said handset; and a catch member positioned adjacent said first end of said handset substantially adjacent said outer surface of said cradle such that, in the partially ejected position, said catch member engages with said lip on said handset to retain said handset in said partially ejected position wherein said first end of said handset projects out of said plane defined by said outer surface of said cradle a distance substantially equal to said pre-selected thickness of said handset and such that a user can remove said handset from said cradle by pulling on said handset to disengage said catch member from said lip.

17. The assembly of claim 16, wherein said outer side of said handset is substantially flush with said outer surface of said cradle when said handset is in said fully secured position.

18. The assembly of claim 16, wherein said movable catch mechanism comprises:

a slidable release member that is positioned on said outer surface of said cradle and wherein said slidable release member is movable between a first position and a second position and is spring biased into said first position;

a mounting member which is attached to said slidable release member wherein said at least one retaining detent is positioned on said mounting member so as to project into said depression when said slidable release member is in said first position.

19. The assembly of claim 18, wherein a channel is formed on a first end of said handset, substantially extending between said inner and said outer sides, and wherein said lip is formed in said channel substantially adjacent said inner surface.

20. The assembly of claim 16, wherein said ejecting mechanism is comprised of a cantilevered member that is spring biased so as to urge said first end of said handset outward.

21. The assembly of claim 20, wherein said ejecting mechanism exerts an outward force against said handset so as to maintain the engagement between the lip and the catch member so as to retain said handset in said partially ejected position.

22. The assembly of claim 16, wherein said catch member comprises a deformable catch member that is flexibly mounted to said cradle so as to be movable in a direction substantially perpendicular to a plane defined by said first end of said handset in response to said user pulling said handset from said cradle.

* * * * *